United States Patent
Lopez et al.

(10) Patent No.: US 7,411,540 B1
(45) Date of Patent: Aug. 12, 2008

(54) SYNTHETIC APERTURE RADAR (SAR) DATA COMPRESSION

(75) Inventors: Norman A. Lopez, Rochester, NY (US); Michael T. Mulford, Rochester, NY (US)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 529 days.

(21) Appl. No.: 11/077,053

(22) Filed: Mar. 10, 2005

(51) Int. Cl.
*G01S 13/90* (2006.01)

(52) U.S. Cl. ............... 342/25 R; 342/25 A; 342/25 B; 342/25 D; 342/25 F; 342/192; 342/196

(58) Field of Classification Search ............... 342/25 R, 342/25 A, 25 B, 25 C, 25 D, 25 E, 25 F, 159, 342/189, 191, 192, 196
See application file for complete search history.

(56) References Cited

U.S. PATENT DOCUMENTS

| | | | |
|---|---|---|---|
| 4,801,939 A | 1/1989 | Jones | |
| 4,851,848 A * | 7/1989 | Wehner | 342/25 D |
| 4,872,012 A | 10/1989 | Chabries | |
| 5,122,803 A * | 6/1992 | Stann et al. | 342/25 B |
| 5,343,204 A * | 8/1994 | Farmer et al. | 342/25 F |
| 5,463,397 A * | 10/1995 | Frankot | 342/25 C |
| 5,608,404 A * | 3/1997 | Burns et al. | 342/25 A |
| 5,661,477 A | 8/1997 | Moreira et al. | |
| 5,805,099 A | 9/1998 | Nagata | |
| 5,898,399 A * | 4/1999 | Carrara et al. | 342/25 A |
| 5,969,662 A * | 10/1999 | Hellsten | 342/25 A |
| 6,400,306 B1 * | 6/2002 | Nohara et al. | 342/25 R |
| 6,441,772 B1 * | 8/2002 | Hellsten et al. | 342/25 R |
| 7,212,149 B2 * | 5/2007 | Abatzoglou et al. | 342/25 F |
| 7,245,250 B1 * | 7/2007 | Kalayeh | 342/25 R |
| 2003/0142000 A1 * | 7/2003 | Cho | 342/25 |
| 2004/0017307 A1 * | 1/2004 | Cirillo et al. | 342/25 |
| 2005/0073455 A1 * | 4/2005 | Chow et al. | 342/25 F |

* cited by examiner

*Primary Examiner*—John B Sotomayor
(74) *Attorney, Agent, or Firm*—RatnerPrestia (57) ABSTRACT

A method of compressing phase history (PH) data includes (a) dividing PH data into multiple sub-apertures; (b) transforming the sub-apertures into multiple coarse resolution images; and (c) compressing each of the coarse resolution images. Compressing each of the coarse resolution images may include (i) selecting at least one image from the coarse resolution images to form a base image, (ii) differencing each of the coarse resolution images from the base image to form residual images, and (iii) quantizing the residual images.

23 Claims, 9 Drawing Sheets

SYNTHETIC APERTURE RADAR (SAR) DATA COMPRESSION

TECHNICAL FIELD

The present invention relates, in general, to processing data from a synthetic aperture radar (SAR) imaging system. More specifically, the present invention relates to a system and method for compressing complex phase history (PH) SAR data and complex image SAR data.

BACKGROUND OF THE INVENTION

Synthetic aperture radar (SAR) is a well known technique for developing radar imagery with excellent two-dimensional (2D) resolution. This is typically done by flying an airplane over the ground to be mapped, and successively transmitting a sequence of radar pulses. With the forward motion of the airplane, each successive radar pulse is transmitted from a position a little farther along on the flight path, thus simulating a very long radar array.

Return signals from the transmitted pulses are sampled in the airplane and either processed on board for immediate exploitation or stored or transmitted for processing at another site. The processing is computationally expensive, employing such techniques as fast Fourier transform (FFT), inverse FFT or correlation on vast amounts of data. These operations require vast processing power and storage.

Radar energy is transmitted in the form of sequential pulses, at different time instances in the flight path of the vehicle. The pulses interact with the terrain (and any object on the terrain) and a portion of the pulse energy is reflected back towards the platform and recorded by a detector. Returns from different objects arrive at different times at the detector. These time differences provide information on range, which is then used to create a final radar image.

Typically, the transmitted pulses in a SAR system are sinusoidal in nature. The detector records the reflected sinusoids by recording a complex number, whose phase component is directly related to the time-of-flight, or range, and its magnitude component is proportional to the reflected energy. Thus, data captured in a SAR system is complex in nature, with properties that are unique with respect to data captured in systems from other imaging modalities.

Technology trends in the field of SAR indicate that SAR system designs are continuously pushing the envelope for increases in area coverage and resolution. These trends imply massive amounts of collected data, which in turn, stress the ability to store collected SAR data and rapidly disseminate SAR data.

Progress in microelectronics and computer technology, together with the creation of networks operating at various channel capacities, has been the basis of an infrastructure for a new era in telecommunications. Standards for the efficient representation and interchange of digital images (like JPEG, JPEG2000) have been essential in the development of digital photography applications. Unfortunately, largely due to the uniqueness of SAR data, data compression algorithms employed by current standards (like JPEG, JPEG2000) do not perform optimally with SAR data.

The present invention addresses this problem by providing a system and method for lossy compression of complex SAR data.

SUMMARY OF THE INVENTION

To meet this and other needs, and in view of its purposes, the present invention provides a method of compressing phase history (PH) data. This method includes: (a) dividing PH data into a plurality of sub-apertures; (b) transforming the sub-apertures into a plurality of coarse resolution images; and (c) compressing each of the coarse resolution images. Compressing each of the coarse resolution images may include: selecting at least one image from the coarse resolution images to form a base image, differencing each of the coarse resolution images from the base image to form residual images, and quantizing the residual images. The base image may be selected by performing the following steps: (i) calculating an energy value for each of the coarse resolution images, (ii) selecting a median energy value from the energy values calculated in step (i), and (iii) selecting the base image as a coarse resolution image having the median energy value. Step (a) of the method may form non-overlapping sub-apertures, or may form overlapping sub-apertures. Step (b) of the method may include transforming the sub-apertures using a two dimensional Fourier transform, two one-dimensional Fourier transforms, or a fast Fourier transform (FFT).

Prior to performing step (a), another embodiment of the invention may transform complex image data from a synthetic aperture radar (SAR) into the PH data. Transforming the complex image data includes using an inverse FFT to form the PH data.

Yet another embodiment of the present invention includes a method of forming reconstructed PH data. The method comprises the steps of: (a) extracting coarse resolution images from a storage device; (b) decompressing each of the coarse resolution images to form normalized coarse resolution images; (c) transforming each of the normalized coarse resolution images into a respective sub-aperture; and (d) combining respective sub-apertures to form the reconstructed PH data. Step (c) of this embodiment includes using an inverse FFT to form each of the respective sub-apertures, and step (d) includes placing the respective sub-apertures at different locations into an array to form the reconstructed PH data.

Still another embodiment of the present invention includes a system for compressing phase history (PH) data. The system includes a memory for storing multiple sub-apertures of PH data, wherein each of the sub-apertures is a sub-array formed from an array of PH data; an image formation module for transforming each of the sub-apertures into a respective coarse resolution image; and an encoder for compressing the respective coarse resolution image. The encoder includes a base image selector for selecting at least one image from the respective coarse resolution images and forming a base image, a residual calculator for differencing each of the respective coarse resolution images from the base image and forming residual images, and a quantizer for compressing the residual images. The encoder may also include a normalizer for normalization of the residual images and outputting normalized residual images to the quantizer. The image formation module includes at least one of a two-dimensional Fourier transform, two one-dimensional Fourier transforms, or a fast Fourier transform (FFT) for forming the respective coarse resolution images. The PH data, compressed by the system, may be raw data or polar formatted data. The PH data may be derived from complex image data of a SAR using an inverse FFT module.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

SAR images are derived from detector-recorded data, called phase history (PH) data, through an image-formation process mainly composed of a two-dimensional (2D) fast Fourier transform (FFT) or two one-dimensional FFTs. Phase history data is inherently two-dimensional, where the horizontal axis, ST, is referred to as slow time, and the vertical axis, FT, is referred to as fast time or range-frequency. The horizontal axis, az, of a SAR image, however, is referred to as azimuth (or cross-range) and the vertical axis, r, is referred to as range. This relationship between phase history data and complex image data is shown in equation 1.

$$IMG(az,r) = FFT\{PH(ST,FT)\} \quad (1)$$

A compression method of the present invention exploits a unique, and interesting property of SAR data. If PH data is partitioned into rectangular regions, or sub-apertures, and if any of these sub-apertures is processed into an image, the image possesses the same spatial extent/coverage as an image formed with all the PH data. This image formed from the sub-aperture, however, has lower spatial resolution. This relationship or property is valid for any sub-aperture formed on any part of the PH data.

Figure 1:
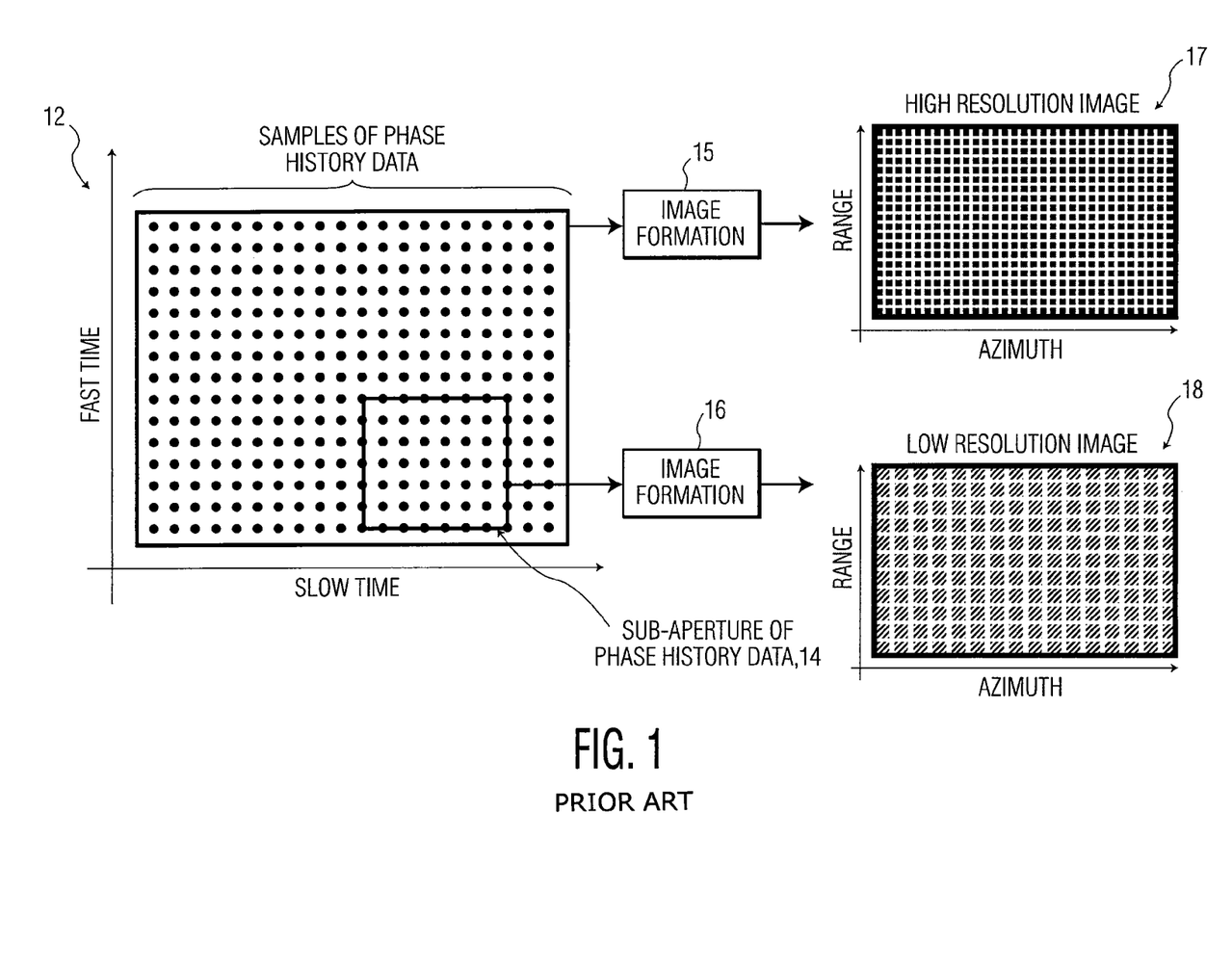
FIG. 1 is a pictorial depicting a comparison between forming a high resolution image using all the phase history data and forming a low resolution image from sub-aperture phase history data.

As defined herein, a SAR image formed from any sub-aperture is referred to as a coarse, or low resolution image. FIG. 1 depicts a comparison between forming a high resolution image from all the phase history data and forming a low resolution image from sub-aperture phase history data. As shown, image formation processor 15 converts the samples of phase history data shown in plot 12 into a high resolution image, generally designated as 17. Similarly, a sub-aperture of phase history data, generally designated as 14, is processed by image formation processor 16 to form a low resolution image, generally designated as 18. It will be appreciated, that the image formed in 17 and the image formed in 18 are similar but vary in degree of resolution.

The PH data, shown in FIG. 1, may be partitioned into N sub-apertures 14 of equal size. An image formation process may be applied to each sub-aperture, to form N low resolution, complex images 18. The inventors discovered that the correlation between these N complex images is high.

In general, from a phase history data set (for example, data set 12), N coarse resolution images (for example, 14) may be generated by partition of the PH data into N sub-apertures. Using the high correlation between these N coarse resolution images as a basis, a method of the invention provides a complete SAR data set from two elements of (1) a single coarse resolution image (base image) and (2) a difference between the coarse resolution image selected in (1) and the remaining set of (N−1) coarse resolution images. The difference between the base coarse resolution image and each of the remaining set of (N−1) coarse resolution images is referred to herein as a difference signal or difference image.

The statistics of this difference signal are more biased than the statistics of any of the individual coarse resolution images. Coding or quantization techniques, like Huffman coding or arithmetic coding, for example, may be applied to these statistically biased difference signals. By applying such techniques to these difference signals, a considerable less amount of information is needed to represent the complete SAR data set.

Figure 2A:
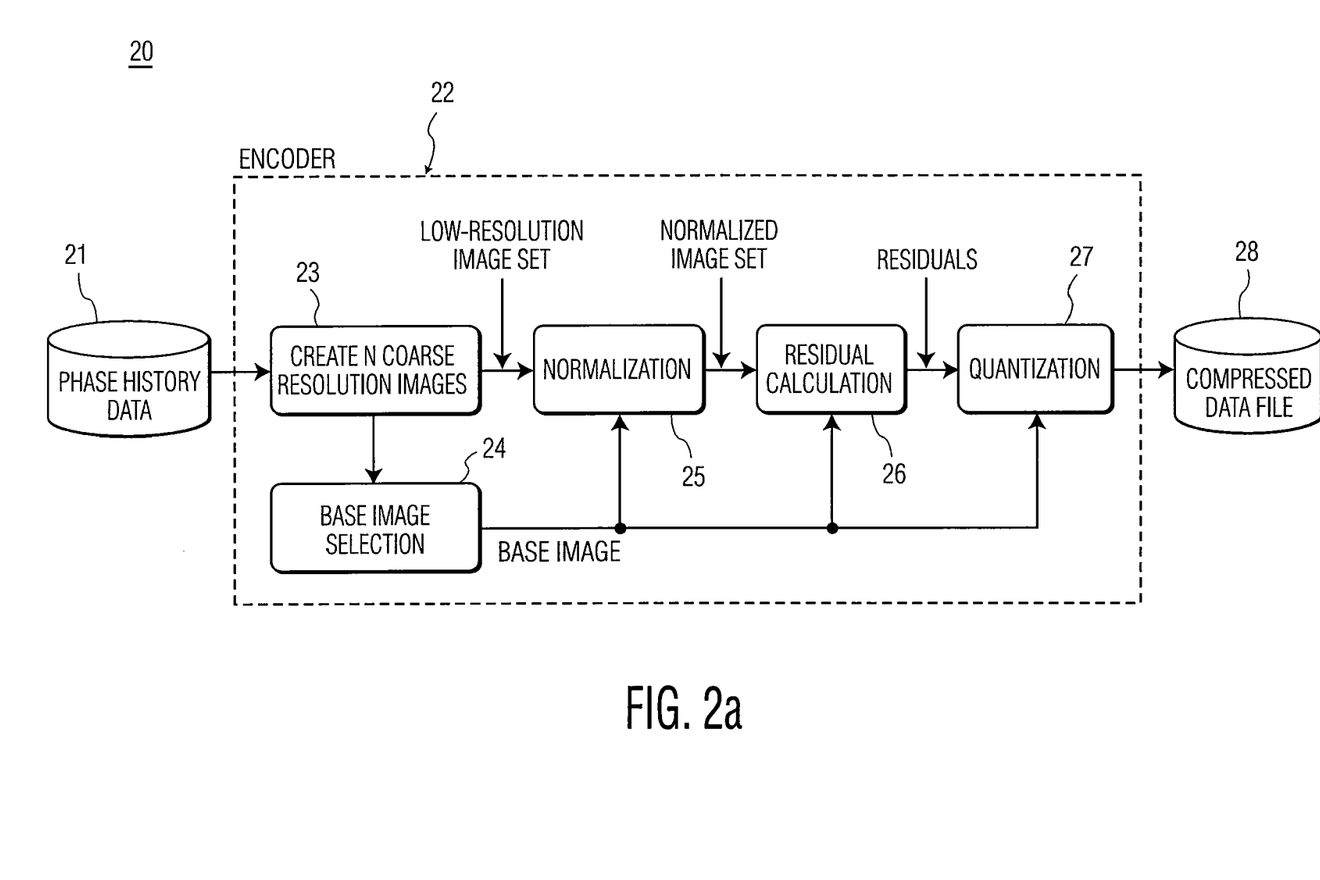
FIG. 2a is an exemplary embodiment of a system for compressing phase history data using an encoder, in accordance with an embodiment of the present invention.

Referring next to FIG. 2a, there shown a block diagram of a system for compressing SAR phase history data. The system, generally designated as 20, includes phase history data file 21, encoder module 22 and compressed data file 28. Encoder module 22 compresses phase history data from file 21 into compressed data file 28. Encoder module 22 includes module 23 for creating N coarse resolution images, normalization module 25, residual calculation module 26, quantization module 27 and base image selection module 24. Each of these encoder modules will be described in detail below.

Figure 2B:
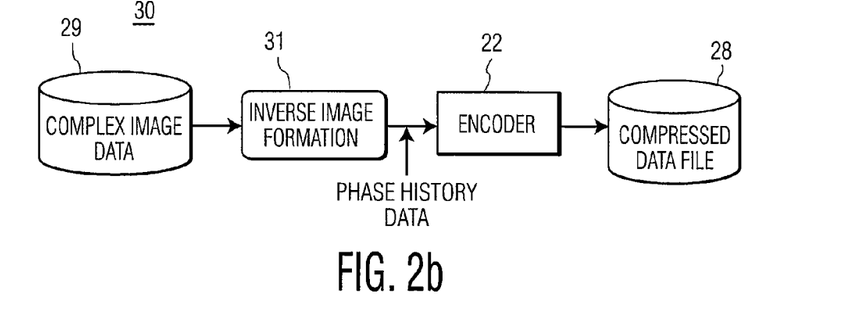
FIG. 2b is another exemplary system for compressing complex image data from a synthetic aperture radar (SAR), in accordance with an embodiment of the present invention.

FIG. 2b depicts system 30 for compressing complex image SAR data stored in file 29 and storing the compressed data into file 28 (which is similar to the compressed data file 28 shown in FIG. 2a). System 30 includes an additional module not required in system 20. This additional module is an inverse image formation module, generally designated as 31. Module 31 converts the complex image data in file 29 into phase history data that is similar to phase history data stored in file 21 of FIG. 2a. The encoder shown in FIG. 2b, generally designated as 22, may be similar to encoder 22, shown in FIG. 2a. The modules of encoder 22 will now be described in detail.

Module 23 forms N coarse resolution images. The phase history data from file (or database) 21 is partitioned into N non-overlapping, or overlapping, sub-apertures, each of the same size, as shown in FIGS. 3a and 3b, respectively.

Figure 3A:
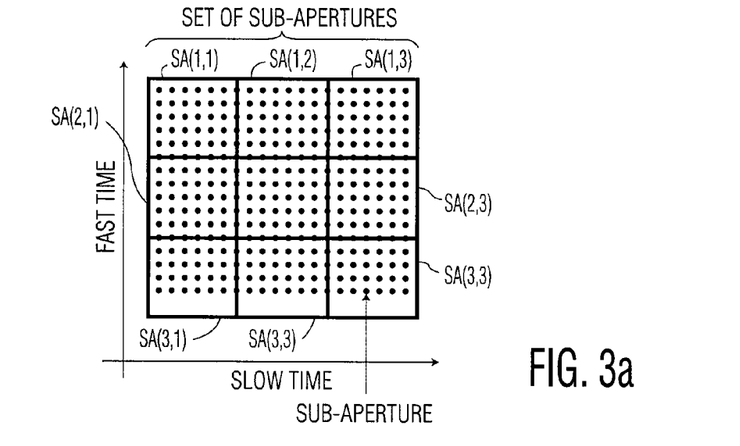
FIGS. 3a and 3b are plots of fast time versus slow time, depicting a set of sub-apertures that either overlap or do not overlap, in accordance with an embodiment of the present invention.
Figure 3B:
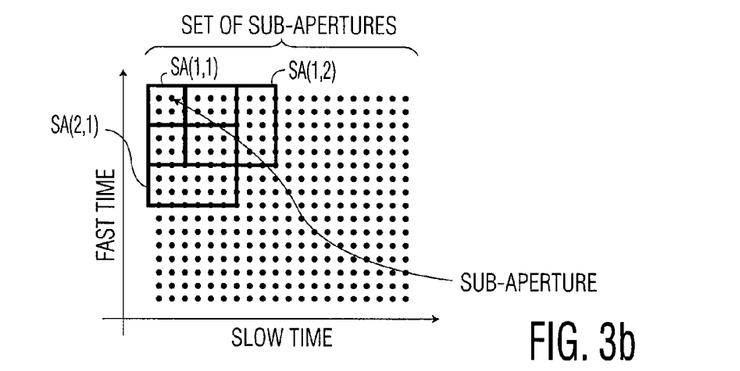

As an example, applicable to both FIGS. 3a and 3b, if the SAR phase history data contains $$M_{FT}^{SAR}$$

fast time samples and $$N_{ST}^{SAR}$$

slow time samples, and the sub-aperture size is defined as an $$M_{FT}^{SA}$$

by $$N_{ST}^{SA}$$

array in the fast time and slow time dimension, respectively, with an overlap of $$O_{FT}^{SA}$$

and $$O_{FT}^{SA},$$

then the number of sub-apertures that may be formed in the fast time and slow time directions is given by equation (2), as follows:

$$NUM_{FT}^{SA} = \frac{M_{FT}^{SAR} - O_{FT}^{SA}}{M_{FT}^{SA} - O_{FT}^{SA}} \ \& \ NUM_{ST}^{SA} = \frac{N_{ST}^{SAR} - O_{ST}^{SA}}{N_{ST}^{SA} - O_{ST}^{SA}}. \quad (2)$$

If $$NUM_{FT}^{SA}$$

or $$NUM_{ST}^{SA}$$

are not integers, the phase history data set may be zero padded until both quantities are integers. In forming N coarse resolution images (module 23), there is no special requirement that drives what the overlap values should be; they may be set arbitrarily. It will be appreciated that the overlaps $$(O_{FT}^{SA} \ \text{and} \ O_{ST}^{SA})$$

are zero in FIG. 3a.

Each of the sub-apertures, labeled SA(m,n) in FIGS. 3a and 3b, is passed through an image formation processor (as shown in FIG. 1) comprised of a 2D FFT, thereby generating $$N = NUM_{FT}^{SA} \times NUM_{ST}^{SA}$$

coarse resolution images of a single scene originally captured in the phase history data. These coarse resolution images are labeled $IMG_{m,n}(az,r)$, and are related to the phase history data contained in each sub-aperture by equation (1).

The set of coarse resolution images is then sent to the base image selection module and the normalization module, respectively designated as 24 and 25 in FIG. 2a. The number of sub-apertures in the fast time and slow time dimension formed in module 23 having the values of $NUM_{FT}^{SA}$ and $NUM^{STSA}$ respectively, may be recorded in compressed file 28. These values aid in the reconstruction of the original SAR data set, as explained later.

Module 24 selects a base image, or reference image. The base image is selected from the set of coarse resolution images generated by module 23. A selection method of the present invention is based on the amount of energy contained in each of the coarse resolution images. For each image in the set, $IMG_{m,n}(az,r)$, it's energy E may be calculated from equation (3).

$$E(m, n) = \sum_{az} \sum_{r} \{IMG_{m,n}(az, r) \times (IMG_{m,n}(az, r))^*\} \quad (3)$$

where the (.)* operation refers to the complex conjugate operation.

The N calculated energies are then sorted from the smallest value to the largest value, and a base coarse resolution image, $IMG_{Base}(az,r)$, is selected as the image having an energy value that falls in a median position of the sorted N calculated energies. The location specifying the sub-aperture position of the selected base coarse resolution image, as values (m,n), is recorded in compressed file 28. This location, as explained later, is used in the reconstruction of the original SAR phase history data.

Continuing the description of FIG. 2a, the N coarse resolution images, formed by module 23, are normalized based on the base image selected by module 24. A factor, $k_{norm}$, is calculated as the inverse of the largest amplitude value of the complex base image, as shown in equation (4).

$$k_{norm} = \frac{1}{\max(\|IMG_{Base}(az, r)\|)}. \quad (4)$$

Each coarse resolution image is then multiplied by this factor. This operation affects the magnitude component of the complex coarse resolution images. The phase component, however, is not affected by this operation. The normalizing factor is recorded in compressed file 28.

It will be appreciated that the base image received from module 24 is also normalized.

Residual calculation module 26 receives the normalized coarse image set and the selected base image. Module 26 transforms the data from a normalized coarse resolution space into a new data space whose statistical properties are a better fit for coding techniques, such as Huffman coding. A residual signal, D(m,n), is generated for each normalized image in the normalized coarse resolution image set by subtracting each normalized coarse resolution image from the normalized base image, as shown in equation (5).

$$D(m,n) = k_{norm} \times \lfloor IMG_{Base}(az,r) - IMG_{m,n}(az,r) \rfloor \qquad (5)$$

Figure 4A:
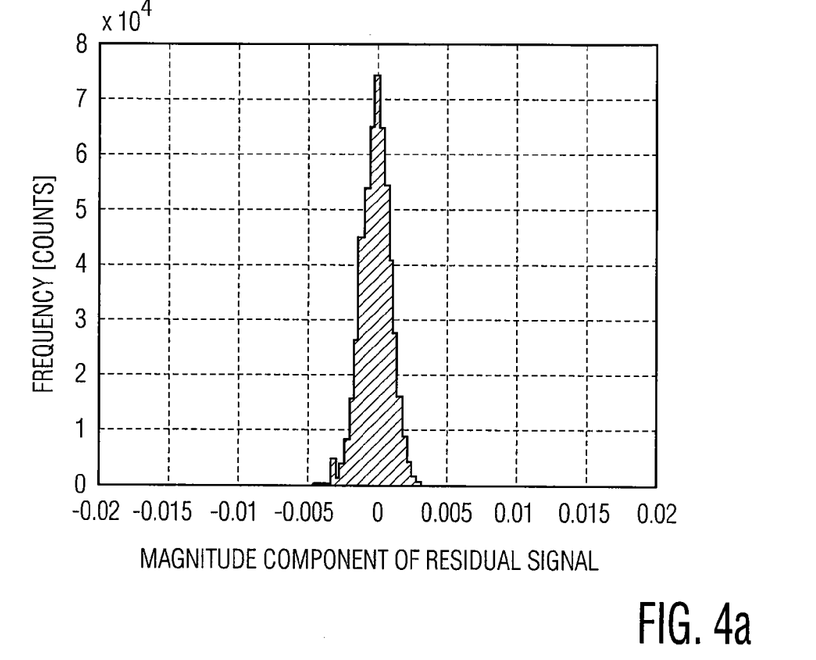
FIG. 4a is a plot of frequency versus magnitude, illustrating a histogram of the magnitude of an exemplary residual signal approximating a Gaussian random distribution, in accordance with an embodiment of the present invention.
Figure 4B:
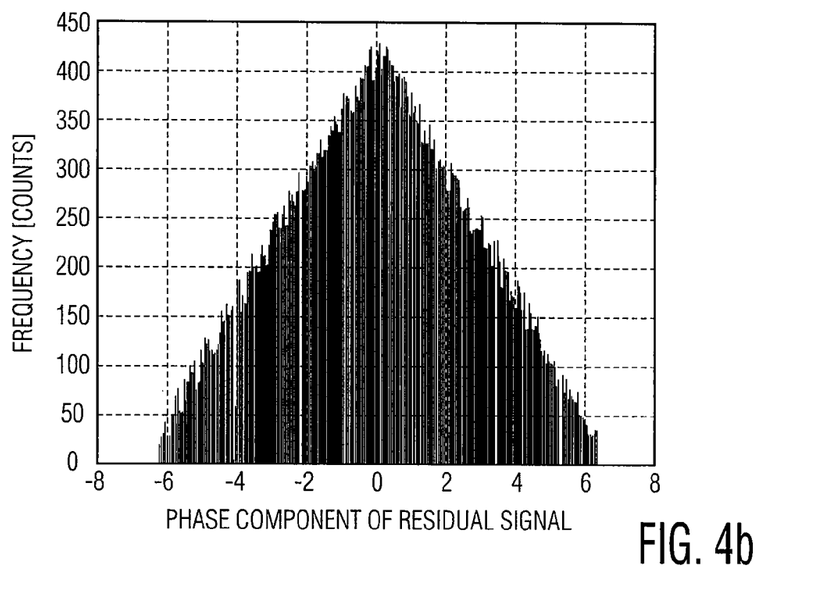
FIG. 4b is a plot of frequency versus phase, illustrating a histogram of the phase of an exemplary residual signal approximating a triangular probability distribution, in accordance with an embodiment of the present invention.

It will be understood that the quantities generated by equation (5) are complex. FIGS. 4a and 4b illustrate histograms of magnitude and phase components, respectively, of one exemplary residual signal. Histograms of complex SAR images are relatively uniform (even) throughout and, therefore, they are harder to compress. The histograms of the residual signal, however, are not uniform throughout and are easier to compress. The histogram shown in FIG. 4a approximates a histogram of a Gaussian random signal, and the histogram shown in FIG. 4b approximates a random variable having a triangular probability distribution.

Figure 5:
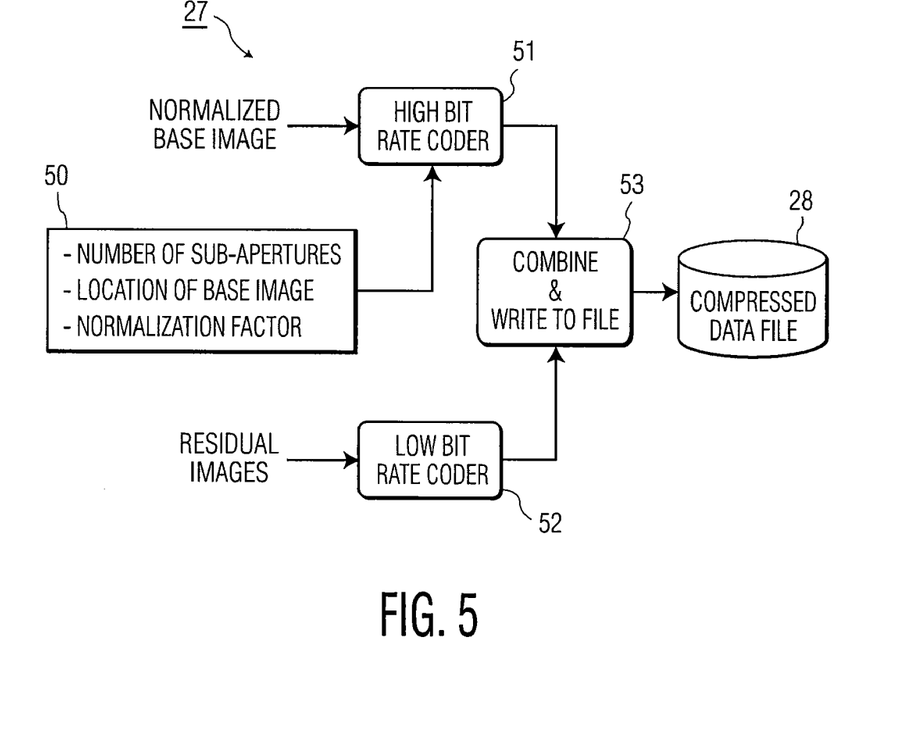
FIG. 5 is a block diagram of an exemplary quantization module of FIG. 2a, in accordance with an embodiment of the present invention.

The residual signal for each normalized image in the normalized coarse resolution image set is sent to quantization module 27 for compression or coding. The residual signals, formed by module 26, are coded to a lesser number of bits than would be required to code a signal (pixel) of the original image. As may best be seen in FIG. 5, the normalized base image along with overhead information stored in module 50 ($NUM_{FT}^{SA}$, $NUM_{ST}^{SA}$, (m,n) location of base image, and $k_{norm}$) are coded by high bit rate coder 51. This data needs to be at the highest fidelity possible, for example 16 bits. The residual signals may be coded using low bit rate coder 52. Low bit rate coder 52 may be, for example, a Huffman coder or an arithmetic coder. The information coded at the high bit rate and the information coded at the low bit rate are combined and written into compressed data file 28 by way of module 53.

Referring now to FIG. 2b, there is shown another embodiment of the present invention, generally designated as 30. The system 30 is different from system 20 (FIG. 2a) in that file or storage 29 includes complex image SAR data rather than complex phase history SAR data contained in file 21 (FIG. 2a). Module 31 converts the complex image SAR data from storage 29 into complex phase history SAR data by way of an inverse FFT (IFFT). Module 31 transforms the complex image SAR data into phase history SAR data similar to the data stored in file 21 of FIG. 2a. After module 31 forms the phase history SAR data, the encoder may use the same components as the encoder of FIG. 2a to compress the data. Encoder 22, shown in FIG. 2b, compresses the phase history data and stores the data in compressed data file 28.

Figure 6:
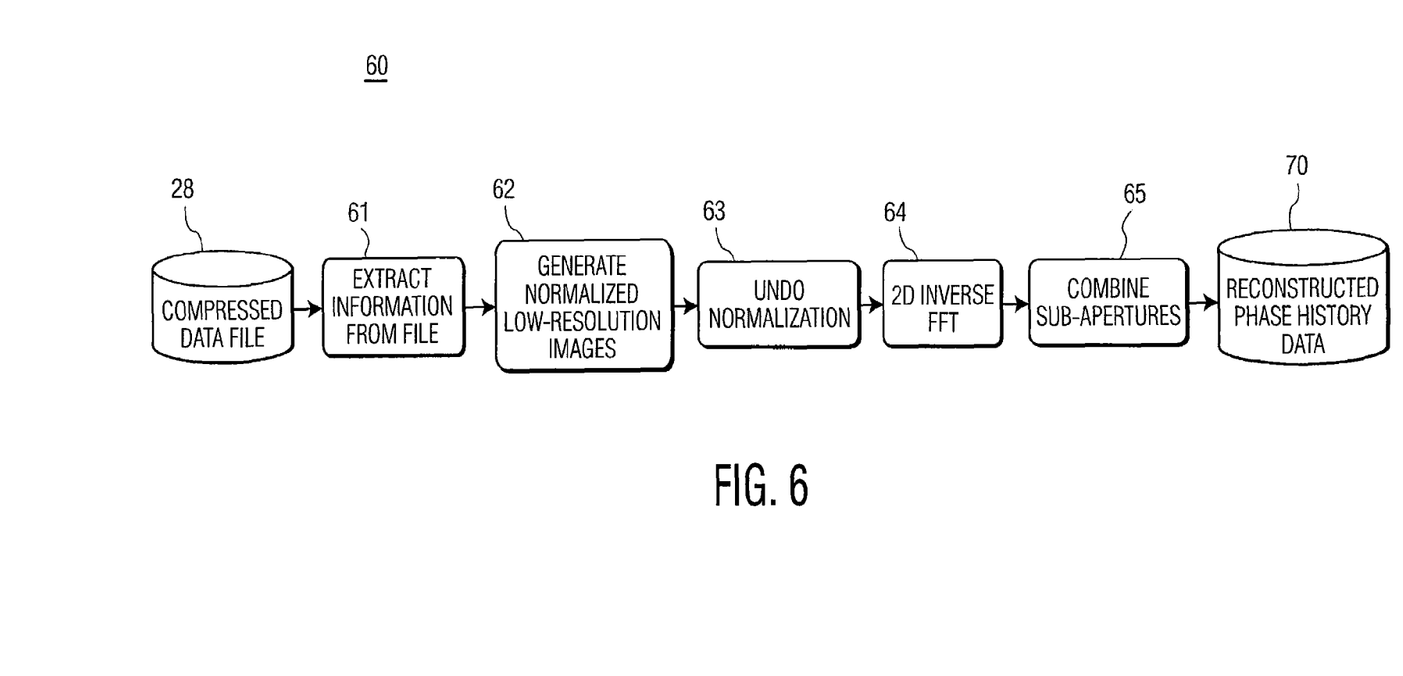
FIG. 6 is an exemplary system for decompressing a compressed data file into reconstructed phase history data, in accordance with an embodiment of the present invention.

Referring next to FIG. 6, there is shown decoder 60 for converting compressed data in file 28 into reconstructed phase history data, stored in file or storage 70. The decoder provides a reverse process of encoder 22. Module 61 extracts the residual signals generated from the quantized information stored in file 28. Also, the normalized base image and overhead information is extracted from the file. With the residual signals in place, each image in the set of normalized coarse resolution images is generated by module 62. Module 62 adds each corresponding reconstructed residual signal to the normalized base image. Next, the normalization factor is applied inversely by module 63 to each low resolution image, including the normalized base image. Next, by way of inverse FFT module 64, each coarse resolution image is converted to the phase history data domain by applying a 2D IFFT. The final step, performed by module 65, combines all the phase history data information together to produce the reconstructed phase history data set.

Figure 7:
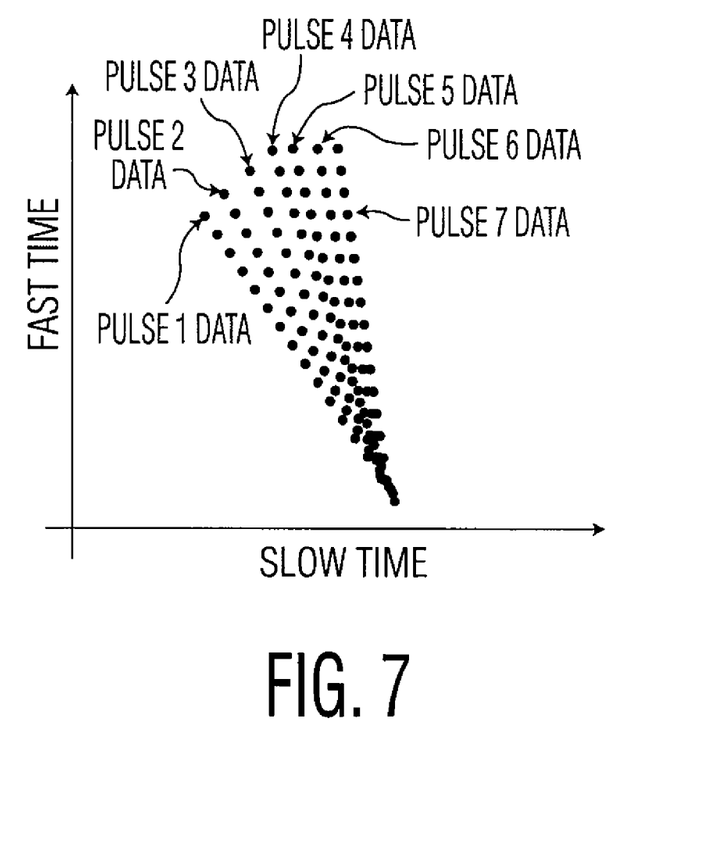
FIG. 7 is an exemplary plot of fast time versus slow time, illustrating samples of PH data collected in an annulus grid.

The compression method of the invention may be applied to two types of phase history (PH) data. In general, phase history (PH) data, is collected on an annulus. The samples comprising the PH data array are in a grid that is not uniformly spaced on a two-dimensional (2D) grid. This is depicted in FIG. 7. This type of PH data is raw or unformatted data.

Figure 8A:
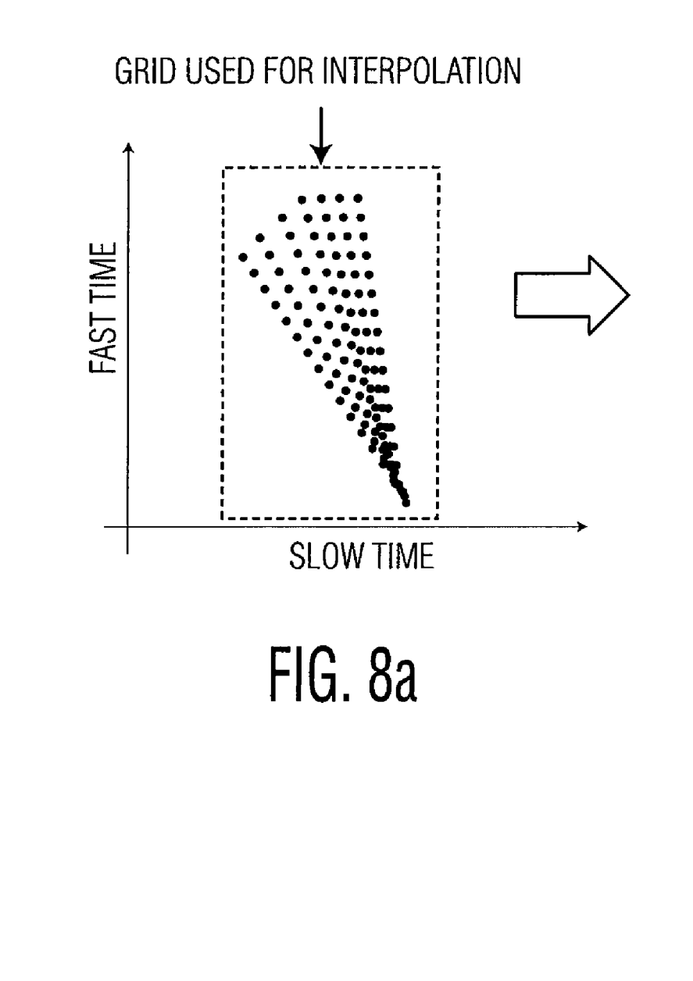
FIGS. 8a and 8b depict two types of PH data, one being non-formatted and the other being polar formatted.
Figure 8B:
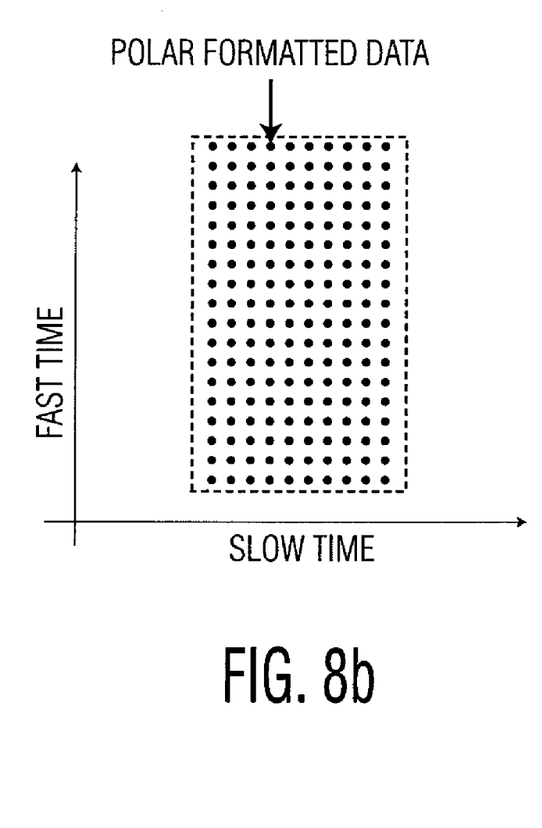

Polar formatting is an operation that transforms the data from an annulus set, shown in FIG. 8a, to a data set defined in a uniformly spaced 2D grid, as depicted in FIG. 8b. The PH data shown in FIG. 8b is known as polar formatted data.

Another embodiment of the present invention will now be described which uses multiple base images. Multiple base images may be utilized to maximize the quality of the reconstructed phase history data, thereby also maximizing the quality of the complex SAR image derived from the phase history data. This embodiment may effectively be used in two instances: (1) for large area data collections, and (2) for data collections that experience high illumination, and/or target variability throughout a collection period.

Figure 9:
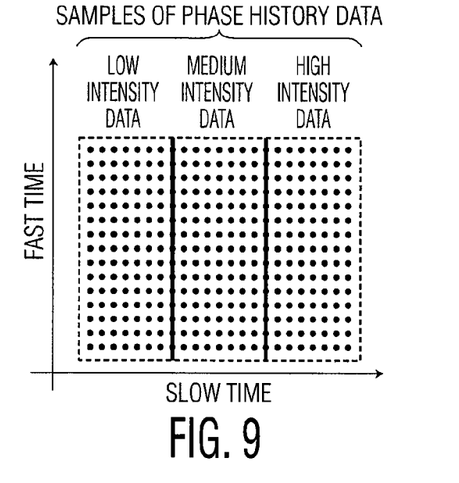
FIG. 9 is an exemplary plot of fast time versus slow time, illustrating samples of phase history data partitioned into three regions.

For example, consider a data collection over an area containing a mountain. As the collection vehicle moves along its trajectory, the intensity of the return pulses may vary depending on the incidence geometry of the pulse. At the beginning of the collection period, for example, the energy in the radar pulse bounces off the mountain in a direction that the SAR system cannot capture. At the end of the collection period, however, the pulses reflect in a direction that the SAR system may capture. In this example, the data in the first column of the phase history data array, shown in FIG. 9, is low in intensity. The intensity of the data in each column increases moving from left to right in FIG. 9. The samples of phase history data, as an example, are categorized into three regions of low, medium and high intensity, as shown.

Due to the variability in intensity of the return pulses during the collection period, coarse resolution images formed from sub-apertures that are extracted from the low intensity data region will be different, especially in contrast appearance, than coarse resolution images formed from sub-apertures that are extracted from the high intensity data region. The correlation between the coarse resolution images may still be high, but the statistical variation of the residual signal will be larger, e.g. the standard deviation will be high.

For the example described above, the present invention selects three base images, one for each intensity region in order to obtain better signal reconstruction. A user may specify using three regions, resulting in the phase history data array partitioned into three regions, depicted in FIGS. 10a and 10b as 102. As shown, phase history data 102 is partitioned into three regions (low, medium and high intensity data) by way of region partitioning module 104. The present invention next encodes each region using multiple encoder stages 106a, 106b and 106c. Each encoder stage may be similar to encoder 22 of FIG. 2a. The encoding may be implemented, as previously described, by independently encoding each region. Multiple coarse resolution images (N coarse resolution images) are formed as N sub-apertures. A base image is selected from the N sub-apertures. The sub-apertures are each normalized and differenced from the selected normalized base image, thereby forming residuals. The residuals are then quantized and stored in compressed data file 108.

Figure 10A:
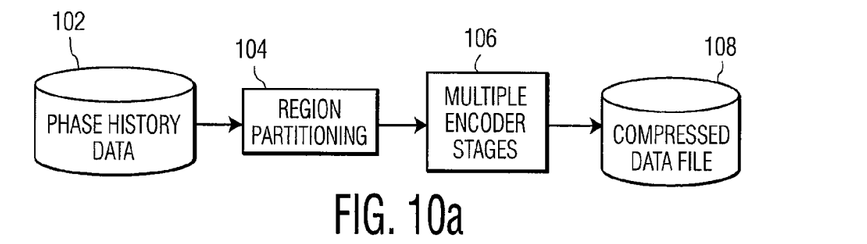
FIGS. 10a and 10b schematically illustrate partitioning of samples of phase history data into three regions and the separate encoding of each region, in accordance with another embodiment of the present invention.
Figure 10B:
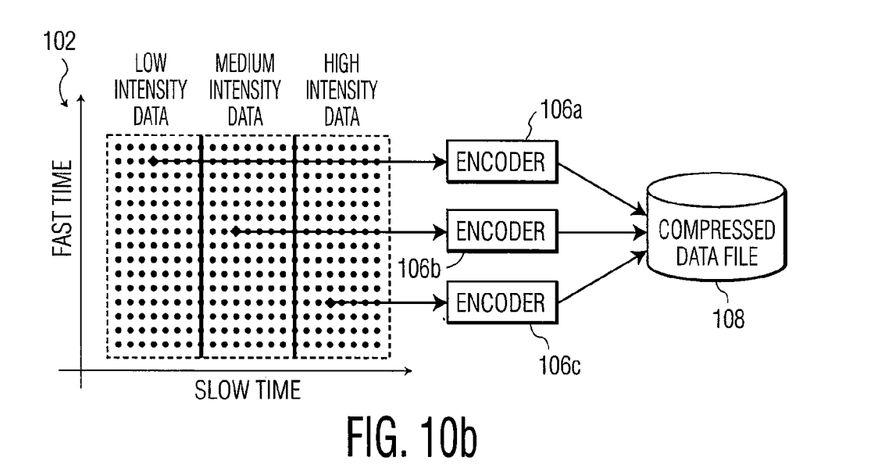

Although the method shown in FIGS. 10a and 10b results in a reduced compression ratio, it will be appreciated that the quality of the reconstructed data is increased.

In the previous example, intensity variations were assumed in the slow time dimension, so the partitioning only occurred in this dimension (the number of rows in the phase history data array was not reduced in the partitions). However, another possible implementation may be by partitioning the data in the fast time dimension (the number of columns in the phase history data array is not reduced in the partitions).

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of compressing phase history (PH) data comprising the steps of:
    (a) dividing PH data into a plurality of sub-apertures;
    (b) transforming the sub-apertures into a plurality of coarse resolution images; and
    (c) compressing each of the coarse resolution images.

2. The method of claim 1 wherein
compressing each of the coarse resolution images includes:
    selecting at least one image from the coarse resolution images to form a base image,
    differencing each of the coarse resolution images from the base image to form residual images, and
    quantizing the residual images.

3. The method of claim 2 wherein the base image is selected by performing the following steps:
    (i) calculating an energy value for each of the coarse resolution images,
    (ii) selecting a median energy value from the energy values calculated in step (i), and
    (iii) selecting the base image as a coarse resolution image having the median energy value.

4. The method of claim 1 wherein
step (a) includes one of the following:
    (i) forming non-overlapping sub-apertures, and
    (ii) forming overlapping sub-apertures.

5. The method of claim 1 wherein
step (b) includes transforming the sub-apertures using a two-dimensional Fourier transform, two one-dimensional Fourier transforms, or a fast Fourier transform (FFT).

6. The method of claim 1 wherein
the phase history data contains $M_{FT}^{SAR}$ fast time samples and $N_{ST}^{SAR}$ slow time samples, and
the sub-aperture size is defined as an $$M_{FT}^{SA}$$

by $$N_{ST}^{SA}$$

array in the fast time and slow time dimension, respectively, having an overlap of $$O_{FT}^{SA} \text{ and } O_{ST}^{SA},$$

then the number of sub-apertures formed in the fast time and slow time direction is given by the following equation:

$$NUM_{FT}^{SA} = \frac{M_{FT}^{SAR} - O_{FT}^{SA}}{M_{FT}^{SA} - O_{FT}^{SA}}$$

$$NUM_{ST}^{SA} = \frac{N_{ST}^{SAR} - O_{ST}^{SA}}{N_{ST}^{SA} - O_{ST}^{SA}}.$$

7. The method of claim 1 wherein
the PH data is raw data or formatted data.

8. The method of claim 7 wherein
the formatted data is polar formatted data.

9. The method of claim 1 further including the step of:
prior to performing step (a), transforming complex image data from a synthetic aperture radar (SAR) into the PH data.

10. The method of claim 9 wherein
transforming the complex image data includes using an inverse FFT to form the PH data.

11. The method of claim 1 wherein
step (c) includes using both a high bit rate coder and a low bit rate coder to compress the coarse resolution images.

12. The method of claim 1 wherein
the PH data includes magnitude components and phase components.

13. The method of claim 1 wherein
compressing each of the coarse resolution images includes normalizing each of the sub-apertures, prior to the compressing step.

14. The method of claim 1 wherein
the PH data is partitioned into multiple regions, and
steps (a), (b) and (c) are performed for each of the multiple regions independently of each other region.

15. A method of forming reconstructed PH data comprising the steps of:
    (a) extracting coarse resolution images from a storage device;
    (b) decompressing each of the coarse resolution images to form normalized coarse resolution images;
    (c) transforming each of the normalized coarse resolution images into a respective sub-aperture; and
    (d) combining respective sub-apertures to form the reconstructed PH data.

16. The method of claim 15 wherein
step (c) includes using an inverse FFT to form each of the respective sub-apertures, and
step (d) includes placing the respective sub-apertures at different locations into an array to form the reconstructed PH data.

17. A system for compressing phase history (PH) data comprising
    a memory for storing multiple sub-apertures of PH data, wherein each of the sub-apertures is a sub-array formed from an array of PH data,
    an image formation module for transforming each of the sub-apertures into a respective coarse resolution image, and an encoder for compressing the respective coarse resolution image.

18. The system of claim 17 wherein the encoder includes
a base image selector for selecting at least one image from the respective coarse resolution images and forming a base image,
a residual calculator for differencing each of the respective coarse resolution images from the base image and forming residual images, and
a quantizer for compressing the residual images.

19. The system of claim 18 wherein the encoder includes
a normalizer for normalization the residual images and outputting normalized residual images to the quantizer.

20. The system of claim 17 wherein
the image formation module includes at least one of a two-dimensional Fourier transform, two one-dimensional Fourier transforms, or a fast Fourier transform (FFT) for forming the respective coarse resolution images.

21. The system of claim 17 wherein
the PH data is raw data or polar formatted data.

22. The system of claim 17 wherein
the phase history data contains $$M_{FT}^{SAR}$$

fast time samples and $$N_{ST}^{SAR}$$

slow time samples, and the sub-aperture size is defined as an $$M_{FT}^{SA}$$

by $$N_{ST}^{SA}$$

array in the fast time and slow time dimension, respectively, having an overlap of $$O_{FT}^{SA} \text{ and } O_{ST}^{SA},$$

then the number of sub-apertures formed in the fast time and slow time direction is given by the following equation:

$$NUM_{FT}^{SA} = \frac{M_{FT}^{SAR} - O_{FT}^{SA}}{M_{FT}^{SA} - O_{FT}^{SA}}$$

$$NUM_{ST}^{SA} = \frac{N_{ST}^{SAR} - O_{ST}^{SA}}{N_{ST}^{SA} - O_{ST}^{SA}}.$$

23. The system of claim 17 wherein
the PH data is derived from complex image data of a SAR using an inverse FFT module.

* * * * *